Patented Sept. 2, 1952

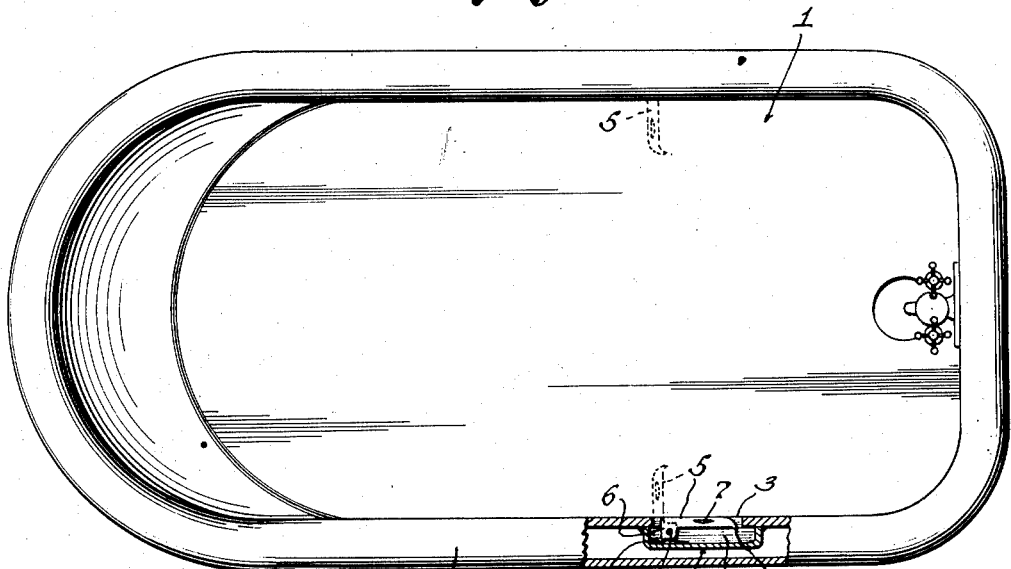
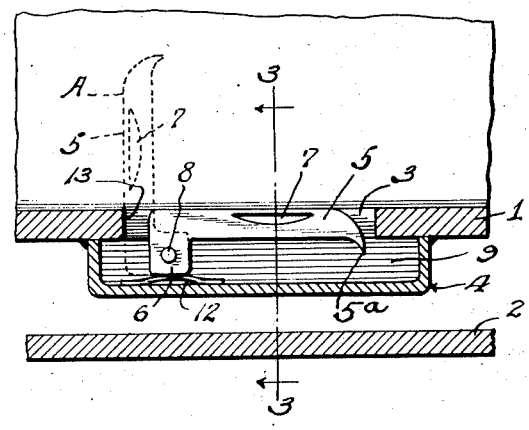
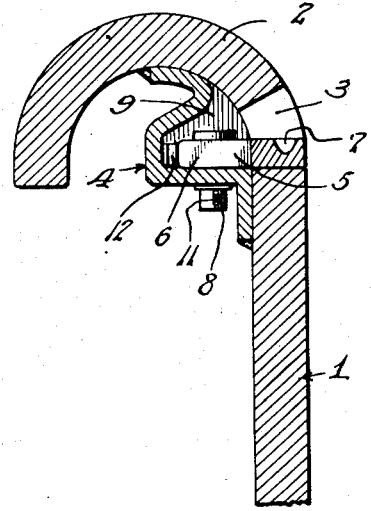
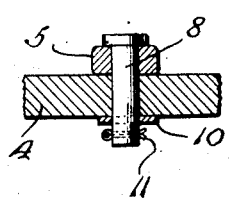

2,608,693

UNITED STATES PATENT OFFICE 2,608,693

ATTACHMENT FOR BATHTUBS

Knut L. Hansen, Antioch, Calif.

Application July 18, 1950, Serial No. 174,510

1 Claim. (Cl. 4—185)

This invention relates to an attachment for bath-tubs.

An object of this invention is to provide on the sides of a bath-tub two similarly constructed grip or handle devices, each of which comprises a movable handle that can be moved outwardly at an angle to the side of the bath-tub, whereby the bather can easily grip the handle to assist in leaving the bath-tub.

Another object of this invention is to provide under the rim of the bath-tub pivotally-mounted handles, which, when not in use, will be out of the way, but when in use they will be projecting into the bath-tub for the bather to easily grasp, for most efficient results.

With the foregoing and other objects in view, this invention comprises certain novel constructions, combinations, and arrangements of parts as will be hereinafter fully described, illustrated in the accompanying drawings, and more particularly pointed out in the appended claim.

In the drawings:

Figure 1 is a top plan view of a bath-tub, the rim thereof and the part of a device constructed in accordance with this invention shown in horizontal section.

Figure 2 is an enlarged fragmentary sectional view of a bath-tub and a casing constructed in accordance with this invention.

Figure 3 is a vertical sectional view, taken on line 3—3, Figure 2, and looking in the direction of the arrows.

Figure 4 is an enlarged sectional view showing a part of the casing and the small stub shaft.

Referring to the drawings, in which the preferred embodiment of this invention is illustrated, 1 designates a bath-tub and 2 the rim thereof. There are two of the devices, constructed in accordance with this invention, preferably employed on each bath-tub. However, as these devices are similarly constructed, it will only be necessary to specifically describe one.

On each side of a bath-tub 1, there is formed an opening 3. Under rim 2 is placed a casing 4, which casing is suitably affixed to the bath-tub, as by welding or like method. This casing 4 covers the opening 3 to the extent that no water can leak from the bath-tub onto the floor in which the bath-tub is located.

A grip or handle 5 is provided with a right angle extension 6, and is also provided with a finger-receiving socket 7. A small stub shaft 8 extends through the extension 6 and the bottom of the casing 4. This small stub shaft 8 is positioned in the pocket 9 of casing 4. On the lower part of stub shaft 8 is a washer 10 and under washer 10 is a cotter pin 11. By this arrangement handle 5 is pivotally mounted upon casing 4. Normally, the handle 5 is closed within the opening 3 and pocket 9, as clearly shown in Figure 2. A bowed spring 12 is preferably placed in pocket 9 against the outer end of extension 6, Fig. 2. This bowed spring 12 permits easy operation of the handle 5, but is sufficiently strong to hold handle 5 in a closed or locked position within the opening 3 and pocket 9, against accidental movement. When the bather wishes to utilize the handle 5 he may place his finger in the socket 7, drawing outwardly thereon, which causes the handle 5 to move outwardly within the bath-tub until the outer edge of handle 5 hits against the end 13, of opening 3, Fig. 2, whereupon the operator can place his whole strength on the handle without causing the handle to move further backwards. Then when the handle is not being used it can be closed, as shown in Figure 2, and spring 12 will act to hold the handle in closed position.

The device is exceedingly useful because when in its open position, per dotted lines A, the bather has a direct hold by using his entire hand without having to strain as if grapsing a side or interior support, such as a fixed support built into the side of a bathtub. After using the handles, the bather can close said handles, placing them out of the way, ready for use when desired.

The opening 3 is sufficiently large to permit the bather's fingers to engage the handle preparatory to using the handles at right angles to the sides of the tub, which affords an easy grip as well as a maximum holding power on the part of the bather.

When the operator grasps the handle 5, his hand will usually bear against curved horn 5a, preventing a wet hand from slipping off handle 5.

While I have described the preferred embodiment of the invention and illustrated the same in the accompanying drawings, certain minor changes or alterations may appear to one skilled in the art to which this invention relates during the extensive manufacture of the same, and I, therefore, reserve the right to make such changes or alterations as shall fairly fall within the scope of the appended claim.

What I claim is:

The combination with a bathtub having an outwardly rolled top edge extending around its upright walls, said bathtub having a slot opening from within the tub into the space below said rolled edge, a casing secured to the outer surface of the bathtub beneath the rolled edge and having a bottom wall aligned with the bottom of said slot whereby liquid in said casing will drain into the tub, said casing enclosing the outer opening of the slot throughout whereby to prevent liquid in the casing from draining on to a floor supporting the tub, a handle normally extending along said slot and resting on the bottom of the slot, said handle normally partially closing said slot, an arm extending from one end of the handle into said casing and resting on the bottom wall thereof, said arm having an end rectangular in plan, a pivot extending upwardly from the bottom wall of the casing through said arm, and a leaf spring in said casing bearing against said rectangular end.

KNUT L. HANSEN.

REFERENCES CITED

The following references are of record in the file of this patent:

UNITED STATES PATENTS

| Number | Name | Date |
|---|---|---|
| 959,235 | Lemieux | May 24, 1910 |
| 2,059,171 | Harris | Oct. 27, 1936 |
| 2,066,088 | Bentley | Dec. 29, 1936 |

FOREIGN PATENTS

| Number | Country | Date |
|---|---|---|
| 484,446 | Great Britain | May 5, 1938 |